United States Patent [19]
Persson

[11] 3,924,468
[45] Dec. 9, 1975

[54] SHOWER SAFETY COMFORT TEMPERATURE GUIDE

[76] Inventor: Russell C. Persson, 661 San Felipe St., Salinas, Calif. 93901

[22] Filed: June 26, 1974

[21] Appl. No.: 483,217

[52] U.S. Cl. .......... 73/343 R; 73/362.1; 116/129 F; 116/129 S
[51] Int. Cl.² ...................... G01K 1/14; G01K 5/70
[58] Field of Search..... 116/114.5, 106, 101, 129 B, 116/129 E, 129 H, 129 T, 129 S, 136.5; 73/349, 362.8, 363.5, 363.7, 343 R, 362.1

[56] References Cited
UNITED STATES PATENTS

| | | | |
|---|---|---|---|
| 1,272,396 | 7/1918 | Dixon et al. | 116/129 E |
| 1,422,378 | 7/1922 | Ryan et al. | 73/363.7 X |
| 1,739,285 | 12/1929 | Boyce | 73/362 X |
| 2,034,852 | 3/1936 | Wilhjelm | 73/349 X |
| 2,301,879 | 11/1942 | Jenny | 73/363.5 |
| 2,626,524 | 1/1953 | Harman | 73/349 X |
| 2,785,530 | 3/1957 | Mayer | 116/129 R X |
| 3,779,079 | 12/1973 | Snook | 73/362.8 X |

FOREIGN PATENTS OR APPLICATIONS

| | | | |
|---|---|---|---|
| 460,607 | 12/1950 | Italy | 116/114.5 |

Primary Examiner—Richard C. Queisser
Assistant Examiner—Daniel M. Yasich
Attorney, Agent, or Firm—Thomas H. Olson

[57] ABSTRACT

A shower safety comfort temperature guide for use with bathing showers and the like in a manner to assist an individual in pre-judging the comfort zone of the water prior to bodily contact with the water, the guide intended to be attached to the shower head pipe immediately prior to the shower head in a manner to measure the temperature of the water flowing through the pipe and indicating such temperature on a color zone guide dial, the guide including a bimetallic temperature responsive element for sensing the temperature change and connected through a gear mechanism to an indicator for indicating such temperature on the dial face.

8 Claims, 8 Drawing Figures

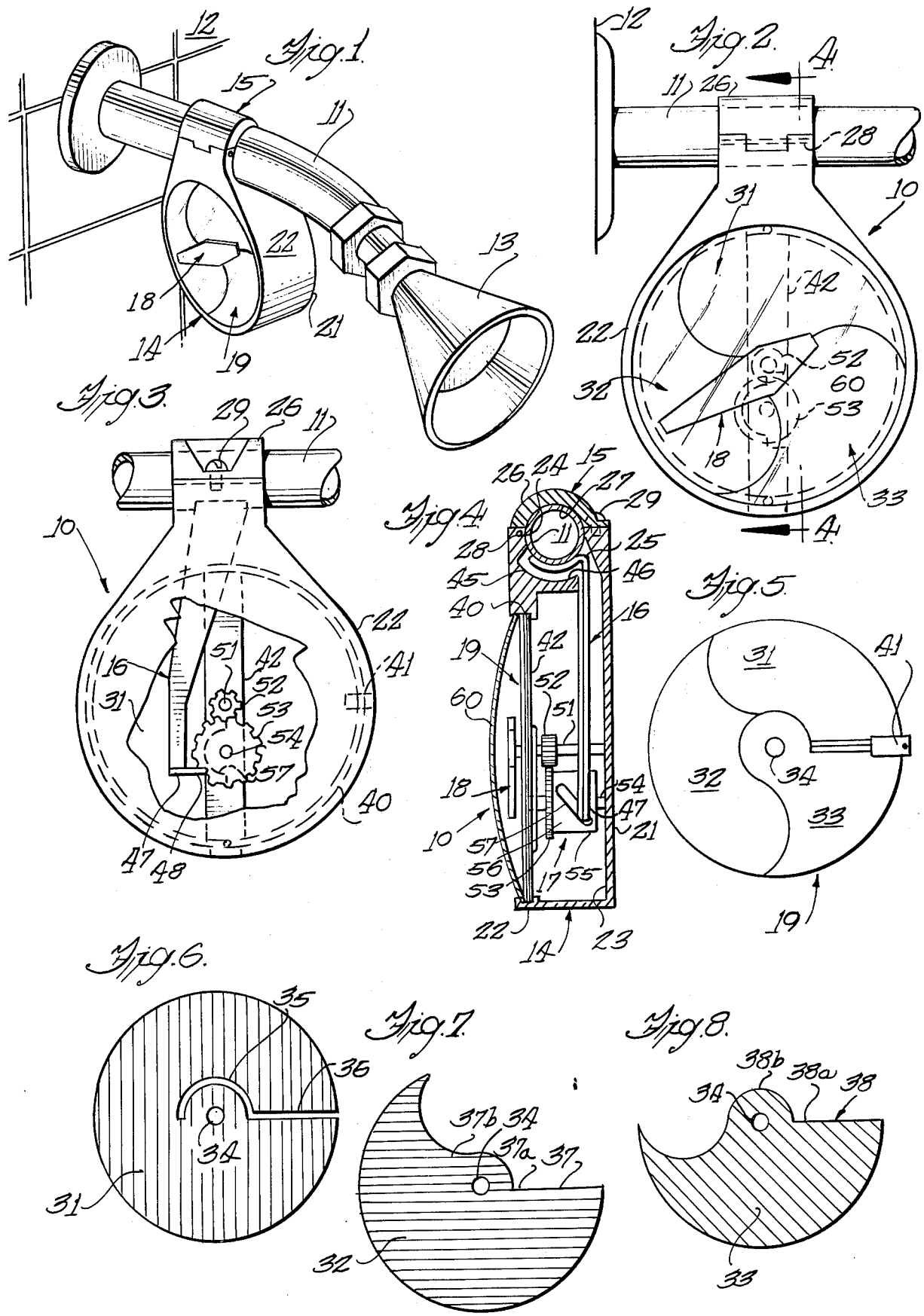

SHOWER SAFETY COMFORT TEMPERATURE GUIDE

BACKGROUND OF THE INVENTION

1. Field of the Invention

This invention relates generally to temperature measuring and indicating devices and more particularlt to a device intended for use with bathing showers to assist an individual in pre-judging the comfort of the water of the shower prior to an individual having bodily contact with such water.

2. Description of the Prior Art

It has been known in the prior art to provide temperature measuring and indicating devices for use with pipes and the like to indicate the temperature of the water standing thereon or flowing therethrough, such devices being for industrial application and thus overly complex and expensive both to manufacture and purchase, such devices also requiring continuous maintenance to assure the accurate working thereof.

Accordingly, such devices have not been within reach of the normal individual for use about the home even though such a device has long been needed for use with shower spray head assemblies such that an individual could prejudge the water temperature of the shower prior to having bodily contact therewith. Many people find this sudden shock of unexpected shower water temperature upon initial bodily contact therewith an uncomfortable, shocking and irritating experience. Further, for some individuals, such as those of advanced age, those of young age, or handicapped persons having limited agility, such initial shock of unexpected shower temperature may prove to be dangerous. This problem is further complicated in hotels, motels, and other commercial establishments catering to individuals temporarily away from home in that such establishments maintain large volumes of excessively hot water circulating through the pipes with it being possible for an individual to burn or scald themselves in an attempt to prejudge water temperature from a shower.

SUMMARY OF THE INVENTION

The present invention recognizes the need for a device to assist an individual in prejudging the comfort zone of water temperature prior to bodily contact with such water in a shower, and recognizing the deficiencies and disadvantages of presently available temperature measuring and indicating devices of complex and expensive structure manufactured principally for commercial and industrial usages, the present invention provides a novel solution in the form of a shower safety comfort temperature guide device intended to be affixed to the pipe just upstream of the showerhead for sensing the temperature of the water in such pipe and indicating such temperature on a comfort zone dial to assist the individual in prejudging the water temperature prior to having to make bodily contact therewith.

It is a feature of the present invention to provide a shower safety comfort temperature guide intended for use with a showerhead in a home, hotel, motel, and the like.

A further feature of the present invention provides a shower safety comfort temperature guide device which is relatively simple in its construction and which therefore may be readily manufactured at a relatively low cost and by simple manufacturing methods permitting the device to be retailed at a sufficiently low price to encourage its widespread use.

Still a further feature of the present invention provides a shower safety comfort temperature guide device which is of a rugged and durable construction, and which is of a non-complex construction requiring no continual maintenance such that the device may be guaranteed by the manufacturer to withstand many years of intended usage.

Still yet a further feature of the present invention provides a shower safety comfort temperature guide device which is easy to use and reliable and efficient in operation.

Yet still a further feature of the present invention provides a shower safety comfort temperature guide device which may be manufactured and installed as part of the original equipment of a shower spray head, or which is readily attached to the shower pipe immediately upstream of the spray head as an accessory item requiring no special skills, tools, or expertise on the part of the individual making such installation.

Yet still a further feature of the present invention provides a shower safety comfort temperature guide device wherein the dial is adjustable for the adjustment of the comfort zone of the water.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a shower spray head affixed to the end of a water supply which has mounted thereon the device of the present invention;

FIG. 2 is a front elevational view of the device mounted on the pipe;

FIG. 3 is a rear elevational view of the device mounted on the pipe with a portion of the housing broken away to illustrate interior details thereof;

FIG. 4 is a cross-sectional view taken along Line 4—4 of FIG. 2;

FIG. 5 is a front elevational view of the dial face with the individual segments thereof adjusted to indicate a desired comfort zone;

FIG. 6 is a front elevational view of the red segment of the dial face;

FIG. 7 is a front elevational view of the green segment of the dial face; and

FIG. 8 is a front elevational view of the blue segment of the dial face.

DESCRIPTION OF THE PREFERRED EMBODIMENT

Referring now to the drawings in detail there is illustrated a preferred form of a shower safety comfort temperature guide device constructed in accordance with the principles of the present invention and designated generally in its entirety by the reference numeral 10. The device 10 is illustrated as mounted on an inlet water pipe 11 projecting outwardly of a shower wall 12 and having a conventional showerhead assembly 13 affixed to the end thereof to provide a shower spray therefrom. The device 10 is comprised of a hollow housing 14 having a clamp portion 15 and supporting therein a bimetallic temperature responsive element 16 drivingly associated with a gear mechanism 17 for the rotation of an indicator pointer 18 about a dial face 19 for indicating the general temperature of the water in pipe 11 to which the device is mounted.

The housing 14 includes a vertical back surface 21 surrounded by depending outwardly projecting circular side walls 22 defining inwardly thereof an open front hollow compartment 23. A semi-circular recess 24 extends through the top portion of side walls 22 normal to the axis of the housing with the bottom segment 25 of such recess being opened and in communication with compartment 23. The clamp portion 15 includes an arcuate leg member 26 having a semi-circular recess 27 extending through the interior thereof and complementary to recess 24, the leg 26 pivoted to the housing at one end by pivot pin 28 with the opposite end including fastening means 29 in the form of a threaded screw for securing such opposite end of the leg to the housing 14. The complementary semi-circular recesses 24 and 27 define therebetween a circular recess of a diameter adapted to receive pipe 11 snugly therein for the mounting of the device 10 to the pipe.

Closing the open front end of compartment 23 is the dial face 19 which consists of three independent overlying dial segments 31, 32, and 33 each having an aperture 34 extending through the axis thereof. The dial segments are colored to indicate temperature zones of the water so as to define a color zone guidance for use by an individual in prejudging the water temperature, with dial segment 31 being red in color to designate hot, dial segment 32 being green in color to designate the desirable and usable comfort zone, and dial segment 33 being blue in color to designate cold.

The dial segment 31 is of a flat circular disc configuration having a semi-circular slot 35 disposed concentric about aperture 34 and joined in one end to a diametrically extending slot 36 opening out of the peripheral edge thereof. The dial segment 32 is of a flat circular configuration having the same diameter as dial segment 31 with a segment 37 cut therefrom in the form of a diametric portion 37a extending from the peripheral edge diametrically inwardly to be joined to one end of a somewhat sinusoidal shaped line segment 37b extending at an incline to line 37a and terminating at the peripheral edge of the segment. Dial segment 33 is of a circular flat disc configuration having the same diameter as dial segment 31 and has a cut-out portion 38 removed therefrom approximately equal to half of the area of the dial segment and including a diametric line 38a extending from a peripheral edge diametrically inwardly toward aperture 34 and terminating a radial distance outwardly therefrom and joined to one end of a somewhat sinusoidal edge 38b extending about aperture 34 and terminating at a peripheral edge of the dial segment which is diametrically opposed from the edge 38.

The dial segments 31, 32 and 33 are disposed in overlying position with dial segment 33 overlying dial segment 32 which, in turn, overlies dial segment 31, the assembly of dial segments being received about their peripheral edges in an annular groove 40 formed in housing 14 about the open front end of compartment 23, with the dial segments being adjustable on each other by rotation about the axis of apertures 34, and with the adjusted positions of the dial segments being retained by a dial lock screw 41 threadedly received in a side wall 22 of housing 14 in a manner to engage the dial segments to retain their relative adjusted positions.

Alternatively, dial lock screw 41 may be of a type inserted directly through the dial face 19, such as through slot 36, in a manner to retain the selected relative positions of the dial segments.

Disposed immediately rearward and in juxtaposition with the back surface of dial segment and extending diametrically vertically between annular slot 40 is a flat supporting bar structure 42 having a central aperture extending therethrough in alignment with apertures 34.

The bimetallic temperature responsive element 16 is formed of a bimetallic strip of material disposed in compartment 23 and extending from the top end thereof downwardly part the center of the compartment and to one side of the axis of the compartment, the strip having one end 45 of an arcuate shape received in an arcuate saddle socket 46 formed inwardly of and adjacent to slot 25 of recess 24 such that the strip end portion 45 is in a heat conducting relationship to the exterior of the pipe 11. The other end 47 of the element 16 is, of course, left free for movement in the compartment 23 as the element moves forwardly or rearwardly of the compartment due to expansion and contraction of the materials making up the element and the response of such materials to thermo changes experienced by the element due to its contact with pipe 11. An actuation cam pin 48 is affixed to element end 47 and extends transversely out therefrom, the use thereof which will be later described.

The gear mechanism 17 consists of an axially extending shaft 51 rotatably supported at one end to housing back surface 21 with its front end portion extending through the central aperture of support bar 42 and thence through aligned apertures 34 to have the indicator pointer element 18 affixed to the front end thereof and movable therewith. A circular gear 52 is permanently affixed concentrically to shaft 51 rearwardly of bar 42 and in compartment 23. A second circular gear 53 is mounted parallel to gear 52 and in intermeshing engagement therewith, the gear 53 being supported for rotation on a shaft 54 which has its opposite ends journaled for rotation in housing back surface 21 and support bar 42 respectively. A cylindrical collar member 55 is disposed concentric with shaft 54 and has one end affixed to gear 53 with the collar extending rearwardly therefrom, the collar having cylindrical side walls 56 with the portion of the side wall nearest the end 47 of bimetallic element 16 having formed integrally therein a diagonal slot 57 defining a cam follower slot adapted to receive therein the projecting free end of actuation cam pin 48. The gear 53 is of a much larger diameter than the gear 52 such that it only requires between one-quarter and one-third of rotation of gear 53 to effect almost complete rotation of gear 52, the rotation of gear 52 effecting the sweeping movement of pointer 18 about dial face 19.

As seen in FIG. 4, movement of element 16 in a direction forwardly of compartment 23 effects the camming action of pin 48 in slot 57 to effect clockwise movement of gear 53, this in turn effecting counter-clockwise movement of gear 52. Similarly, movement of element end 57 rearwardly of compartment 23 effects the camming of gear 53 in a counter-clockwise direction with gear 52 thus moving in a clockwise direction. In this manner the pointer 18 is moved in response to movement of element 16 which, in turn, is responsive to temperature changes as measured at pipe 11.

The dial face 19 and indicator 18 is covered by a transparent face member 60 which has its peripheral edges preferably secured in the annular slot 40.

In operation, the device 10 is preferably installed at a point slightly upstream of the showerhead on the showerhead pipe with the dial face in view of an individual who may operate the hot and cold water controls of the shower at a position safely apart from the shower spray. To obtain the desired temperature the individual user manipulates the hot and cold water valve so as to add more or less hot or cold water as is necessary to obtain the required temperature which is designated by the green comfort zone dial segment 32 on the dial face 19. This comfort zone is preferably preset at the factory with the use of the dial lock 41 permitting an individual to readjust the dial segments to achieve the indication of the desired comfort zone.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A shower safety comfort temperature guide device intended for indicating the temperature of water within a tubular pipeline supplying a showerhead assembly, the device comprising:
   a hollow housing;
   a clamp pivotally affixed to said housing for detachably affixing said housing to said tubular pipe;
   a bimetallic temperature responsive element mounted in said hollow housing, said element having one end thereof secured inside said housing, said one end having a substantial area adjacent said clamp for affording a heat conducting relationship between said tubular pipe and said one end when said housing is clamped to said pipe, the opposite end of said element projecting interiorly of said housing and being a free end movable in said housing in response to temperature changes of said element;
   a dial face affixed to said housing and having temperature comfort zone indicating means thereon, said housing defining an opening for affording visual access to said dial face;
   a pointer member and a shaft for rotatably mounting said pointer member adjacent said dial for sweeping rotative movement thereover to designate temperature indicating portions of said dial, said dial being visible through said opening; a motion transmitting member operatively connected to said pointer for rotation therewith, means operatively connected to said free end of said bimetallic element and responsive to movement of said bimetallic element for coacting with said motion transmitting member such that movement of said bimetallic element is transmitted through said motion transmitting member and said coacting means to effect movement of said pointer member for providing visual indication of the temperature of said element which, in turn, is an indication of the temperature of the water flowing through said pipe when said housing is mounted to said pipe.

2. The device as set forth in claim 1 wherein said housing has a vertical back wall, depending horizontally extending side walls, a top portion, a bottom portion, and a front end, a compartment defined interiorly thereof and opening out of said front end, said top portion having a recess extending transversely therethrough with the recess being of a semi-circular cross-section adapted to receive a portion of said tubular pipe resting therein, a slot defined along the bottom of said recess in communication with said compartment, said temperature element being disposed in said slot; and wherein said clamp comprises a leg member extending between the front and back ends of said housing, said leg member pivotally affixed at one end to said housing, the opposite end of said leg member adapted to be removably fastened to the opposite end of said housing, a recess extending transversely through a bottom surface of said leg member having a semi-circular cross-section complementary to the recess in said housing and adapted to form therewith a transversely extending slot of a circular cross-section to receive said tubular pipe therein when said leg member is affixed to said housing.

3. The device as set forth in claim 2 wherein said bimetallic strip is of a flat configuration having a top end bent into an arcuate form, said top end affixed in said compartment adjacent said slot in said housing recess for saddle type engagement with said tubular pipe when rested in said recess, said element strip projecting into said compartment with said free end thereof movable in a direction toward and away from said front and back ends of said compartment in response to temperature changes of said element.

4. The device as set forth in claim 3 wherein said shaft constitutes a first shaft extending axially through said housing and having one end journaled for rotation in a back surface of said housing and having its opposite end projecting through said dial face and supported for rotation therein, said motion transmitting member including a first gear affixed to said first shaft concentric therewith, a second circular gear disposed substantially parallel to said first gear and in meshing engagement therewith, and a second shaft extending parallel to said first shaft axially through said second gear for rotatably supporting said second gear thereon, said coacting means including a cylindrical collar member disposed concentric with said second gear and extending outwardly therefrom along said second shaft, a diagonal slot extending along the circumference of said cylindrical collar member and defining a cam follower slot, and an actuation cam pin affixed to said free end of said bimetallic element and projecting into said cam follower slot whereby movement of said element free end forwardly of said compartment will effect rotation of said gear assembly in a first direction, and movement of said element free end in a direction toward said back end of said compartment will effect movement of said gears in an opposite direction.

5. The device as set forth in claim 4 wherein said pointer member is affixed to said projecting front end of said first shaft for rotation therewith.

6. The device as set forth in claim 5 wherein said dial is comprised of at least three dial segments, each dial segment being of a flat configuration having an aperture extending centrally therethrough, a first dial segment being of a circular disc configuration and colored red and mounted in said front end of said housing closing said compartment, a second dial segment being colored green and of a flat disc like configuration having a cut-out portion and adapted to be mounted in juxtaposition with said first dial segment with said cut-out portion permitting exterior viewing of a portion of said first dial segment therethrough, and a third dial segment of a flat circular configuration having at least one-half of its cross-sectional area removed in the form of a cut-out portion to expose a portion of said second dial segment when said third dial segment is mounted in juxtaposition thereover, said third dial segment being colored blue; and a dial lock screw associated with said dial segments for retaining said dial segments in an adjusted position relative to each other.

7. The device as set forth in claim 1 wherein said dial face includes at least first and second planar dial segments disposed in overlying relation and having contrasting colors, said first dial segments having a diametrically extending slot therein, said second segment having a sector shaped excision bounded by a generally radially extending edge, said second segment being disposed in said slot so that a portion of said second segment is obscured by said first segment and another portion of said second segment is visible through said opening so that said edge defines a boundary between said segments.

8. The device as set forth in claim 7 wherein said pointer has a circumferential extent of at least about 18° to afford visibility thereof under impaired conditions and wherein said segment edge is of sinusoidal shape having a peak and a valley that are circumferentially spaced from one another by an amount exceeding the circumferential extent of said pointer so as to afford a continuous indication of the position of said pointer relative said segments.

* * * * *